United States Patent [19]

Mitamura et al.

[11] Patent Number: 5,660,647
[45] Date of Patent: Aug. 26, 1997

[54] ROLLING BEARING WITH IMPROVED WEAR RESISTANCE

[75] Inventors: Nobuaki Mitamura; Kenji Yamamura, both of Kanagawa, Japan

[73] Assignee: NSK Ltd., Tokyo, Japan

[21] Appl. No.: 512,419

[22] Filed: Aug. 8, 1995

[30] Foreign Application Priority Data

Aug. 8, 1994 [JP] Japan .................. 6-185718

[51] Int. Cl.$^6$ .................. C23C 8/22; C23C 8/32; C22C 38/24
[52] U.S. Cl. .................. 148/319; 148/906
[58] Field of Search .................. 148/906, 319

[56] References Cited

FOREIGN PATENT DOCUMENTS

| | | | |
|---|---|---|---|
| 64-83625 | 3/1989 | Japan | C21D 9/40 |
| 4165045 | 6/1992 | Japan | C22C 38/00 |
| 2235698 | 3/1991 | United Kingdom | C22C 38/18 |

*Primary Examiner*—Deborah Yee
*Attorney, Agent, or Firm*—Sughrue, Mion, Zinn, Macpeak & Seas

[57] ABSTRACT

In a rolling bearing including an inner race, an outer race and a plurality of rolling elements in which at least one member of the inner race, the outer race and the rolling elements is made of an alloy steel containing: 0.1 to 0.7 wt % of C; 0.8 to 2.0 wt % of V; 0.5 to 3.0 wt % of Cr; 0.3 to 1.2 wt % of Mn; 0.3 to 1.5 wt % of Si; at most 3.0 wt % of Mo; and the balance being Fe, the member being carburized or carbonitrided so that the member has a surface carbon concentration of 0.8 to 1.5 wt % and a surface concentration ratio V/C of 1 to 2.5 in order to cause VC-type carbides to be precipitated on a surface of the member, the rolling bearing exhibits improved wear resistance under a severe condition such as a high-temperature environment and simultaneously the rolling bearing has superior productivity.

1 Claim, 11 Drawing Sheets

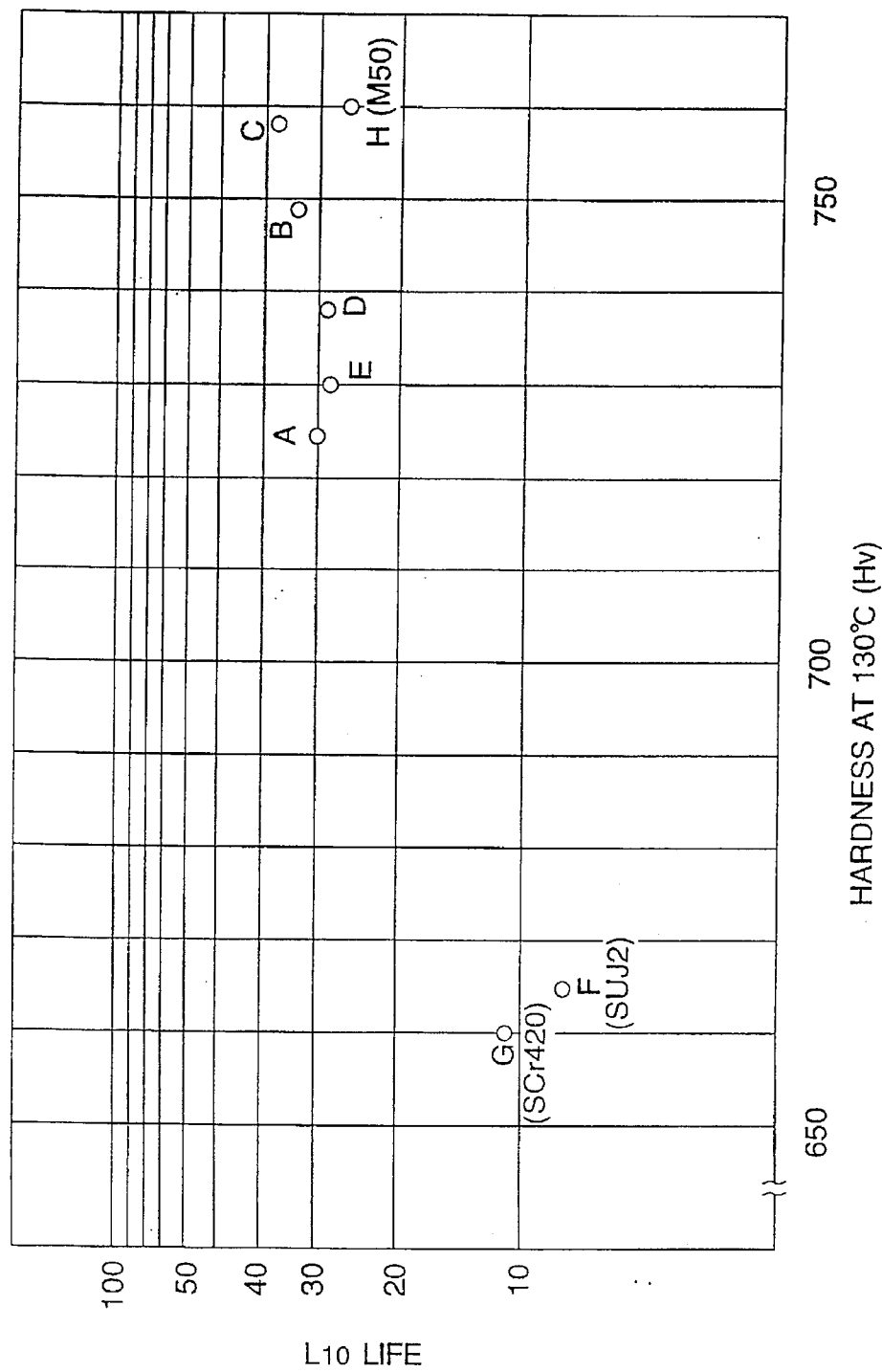

ROLLING BEARING WITH IMPROVED WEAR RESISTANCE

BACKGROUND OF THE INVENTION

The present invention relates to a rolling bearing for use in vehicles, agricultural machines, construction machines, steel making machines and other industrial machines. More particularly, the present invention relates to a rolling bearing having sufficiently improved wear resistance so that it is suitable for use under a severe condition (such as a high temperature environment, a case where the rolling contact occurs with slippage accompanying, or the like).

Rolling bearings are used under extremely severe conditions such that they are subjected to repeated shearing stress under high contact pressure. In order to withstand the applied shearing stress to thereby secure the necessary rolling fatigue life (hereinafter also referred to simply as "life"), conventional rolling bearings have been made of a high-carbon chromic bearing steel (SUJ 2), which is hardened and tempered to provide the Rockwell hardness of $H_RC$ 58 to 64.

Case hardening steels have also been used to extend the life. In order to set a hardness curve in accordance with the distribution of internal shearing stresses due to a contact pressure, low carbon case hardening steels such as SCR 420H, SCM 420H, SAE 8620H, SAE 4320H and the like, which have the superior hardenability, are carburized or carbonitrided, followed by hardening and tempering to produce bearing components that have the surface hardness of $H_RC$ 58 to 64 and the core hardness of $H_RC$ 30 to 48. Thus, the required service life has been secured by the above heat treatments.

Recently, since it tends to require machines with higher load and speed performances in which the rolling bearings are employed, the conditions for the use of bearings become extremely severe. Under the circumstances, there have been caused several problems.

A rising temperature occurs because of the advancement of the higher load or speed performance so that the hardness of the bearing components is reduced to cause deterioration in the rolling fatigue and wear characteristics. In particular, the wear resistance is extremely deteriorated by the increase of slippage due to the higher speed and insufficient lubrication due to the decrease in the viscosity of lubricant under the rising temperature, so that the life of the bearing is reduced.

To deal with these problems, for example, Unexamined Japanese Patent Publication No. Hei. 4-165045 proposes that a bearing steel base is added with Si and Mo as elements improving a resisting property for temper softening in order to increase the strength at a high temperature, so that a bearing which is produced with the base has an extending life under the high temperature.

Further, Unexamined Japanese Patent Publication No. Sho. 64-83625 has proposed that a Si-containing steel is subjected to a so-called "marstressing" treatment in which nitrogen is introduced into the steel surface by supplying ammonia gas into a hardening atmosphere, and subsequently tempering the steel at a high temperature of 400° C. so that it maintains a hardness of at least $H_RC$ 60 to secure the extending life under the high temperature.

It is known that the wear resistance of steels is improved if fine carbides are precipitated on their surface. An approach has been made to improve the wear resistance of bearing materials by adding a large amount of carbide-forming elements such as Cr, Mo and V so that a large amount of carbides are precipitated on the bearing's surface layer to such a degree that it does not adversely affect the life of the bearing. An example based on the approach has been proposed to employ a high-speed steel M50 or the like as a heat-resistant bearing material in which the precipitation hardening is caused by hardening an alloy steel including a large amount of Cr, Mo and V contents, followed by tempering at a high temperature.

The conventional methods described in Unexamined Japanese Patent Publication Nos. Hei. 4-165045 and Sho. 64-83625 are both effective in improving the high-temperature strength of bearings so that their rolling fatigue characteristics are improved. However, there is a problem which it is not very effective in achieving significant improvements of wear resistance.

The other conventional method also has caused the following problems in which the method employs a precipitation hardening steel M50 as a heat-resistant bearing material. First, due to the high C concentration, macro carbides of Cr, Mo and V already occur in a row material so as to reduce the workability in pretreatments. Secondly, the macro carbides of Cr, Mo and V cause stress concentration around themselves because of the occurrence, where it serves as a starting point of flaking contrary to decrease the life of the bearing. In order to solve these problems, it is necessary to perform a solution treatment at a high temperature (e.g. 1,100° C.) so that the macro carbides are solved into the matrix, followed by a special heat treatment to make the carbides fine-grained. However, this method has another problem of not only requiring an equipment for carrying out the special heat treatment but also reducing its productivity.

SUMMARY OF THE INVENTION

The present invention has an object of providing a rolling bearing which exhibits improved wear resistance even if it is used under a severe condition such as a high temperature environment or the like, end which simultaneously has a superior productivity.

This object of the present invention can be attained by a rolling bearing including an inner race, an outer race and a plurality of rolling elements, in which at least one member of the inner race, the outer race and the rolling elements is made of an alloy steel containing: 0.1 to 0.7 wt % of C; 0.8 to 2.0 wt % of V; 0.5 to 3.0 wt % of Cr; 0.3 to 1.2 wt % of Mn; 0.3 to 1.5 wt % of Si; at most 3.0 wt % of Mo; and the balance being Fe, the member being carburized or carbonitrided so that a surface of the member has a carbon concentration of 0.8 to 1.5 wt % and a concentration ratio V/C of 1 to 2.5 in order to has VC-type carbides precipitated on the surface.

The term "surface" as used herein refers a range from an outer surface of a component of the rolling bearing (the inner race, the outer race and the rolling elements) to a depth corresponding to 2% of the diameter of the rolling elements. Namely, the "surface" covers the range of positions where a maximum shearing stress occurs.

BRIEF DESCRIPTION OF THE DRAWINGS

In the accompanying drawings:

FIG. 9 is a graph showing results of fatigue strength tests;

DETAILED DESCRIPTION OF THE PREFERRED EMBODIMENTS

Figure 1:
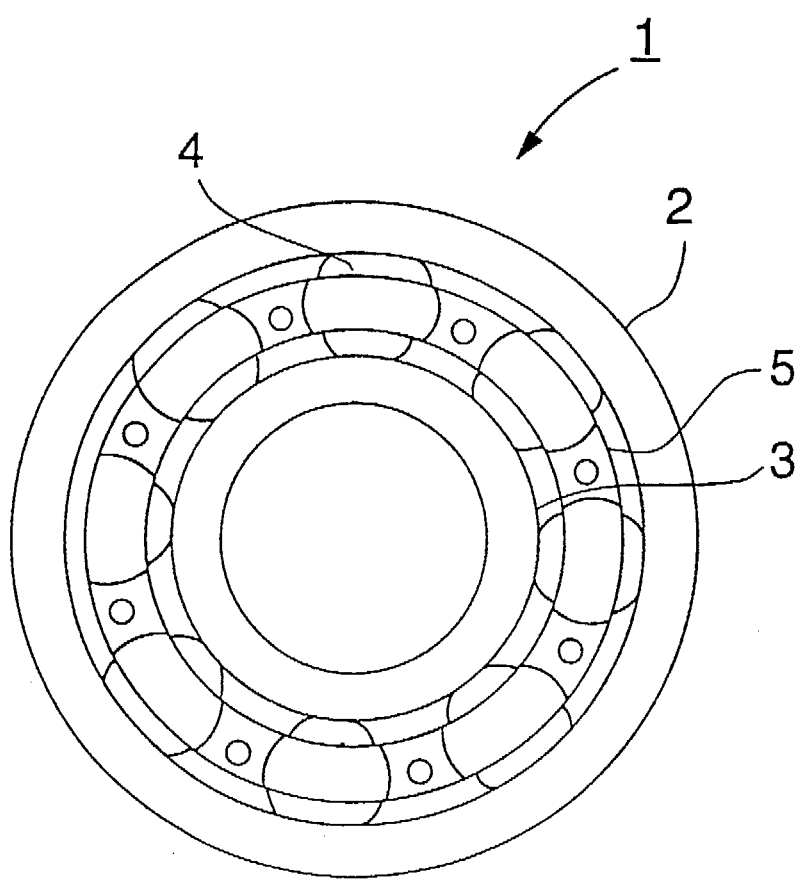
FIG. 1 is a front view of an embodiment of a rolling bearing of the present invention.

Description will be given below in detail of an embodiment of a rolling bearing according to the present invention with reference to the accompanying drawings.

The present inventors aim at the carbide structure and the amount of carbides existing in the bearing's surface layer and studied the relationships between the carbide structure and the amount of carbides existing in the bearing surface layer, and between the service life and the wear resistance of bearings. As a result, the inventors found out that carbides of V, especially VC-type carbides were the most effective in improving the wear resistance and that a large amount of VC-type carbides were formed when the concentration ratio of V to C satisfied the relation of V/C≧1.

Further, the present inventors found out that when the VC-type carbides ($V_4C_3$) containing an appropriate amount of V was formed, the wear resistance was secured to be satisfactory irrespective of contents of Cr and Mo which are other carbide forming elements.

There are described in below the functions of the elements contained in the rolling bearing of the present invention, as well as the criticality of the content of each element.

C: 0.1 to 0.7 wt %

It is defined that the specific carbon content is contained in a raw material before it is subjected to a heat treatment. It means that the present invention employs a low-medium carbon steel as a raw material. When a high carbon steel with a C content exceeding 0.7 wt % is employed, the carbides are already precipitated in an initial state of raw material so as to reduce the plastic workability and turningability to form a product before heat treatments are performed. Additionally, when a high C concentration is contained in the raw material, a significant amount of retained austenite is contained from the surface to the core of the material after it has been subjected to hardening and tempering, so that the dimensional stability of the material is deteriorated. Accordingly, the present invention secures the superior workability in pretreatments by employing a low-medium carbon steel with the C content of 0.1 to 0.7 wt % as the raw material. Additionally, the present invention adjusts a surface of finished products to have a carbon concentration within a specified range of 0.8 to 1.5 wt % by performing the carburizing or carbonitriding as a heat treatment which is subsequent to the pretreatments. The carbonitriding is particularly preferable in the heat treatment for the purpose of adding N which is an effective element in resisting property for temper softening.

C concentration in the product surface: 0.8 to 1.5 wt %

Carbon is the essential element for forming carbides and transforming the base metal to martensite so as to increase the hardness after hardening and tempering.

The carbon content contained in the product surface is set to at least 0.8 wt % in order to secure the rolling fatigue strength necessary for the finished product and to form the desired carbides. The upper limit of the carbon content of the product surface is set to 1.5 wt % in order to prevent reticulate coarse carbides from precipitating at grain boundaries as a mixed structure of an auetenitic phase and unsolved carbides during carbonitriding. Furthermore, if the carbon content of the product surface exceeds 1.5 wt %, the coarsening of cementite carbides ($Fe_3C$ carbides) occurs so that it becomes a starting point for the deterioration of the rolling fatigue characteristics and the crack strength in the bearing of the finished product.

The present invention employs a low alloy steel that is based on the above-described low-medium carbon steel and which contains alloy elements with a composition as set forth in below:

Cr: 0.5 to 3.0 wt %
Mo: at most 3.0 wt %
Si: 0.3 to 1.5 wt %
Mn: 0.3 to 1.2 wt %

This low alloy steel is employed in the present invention because it has the superior workability in the pretreatments or productivity in the heat treatments.

Cr: 0.5 to 3.0 wt %

Chromium which improves hardenability is an essential element to bearing materials. Additionally, if Cr is added in a large amount, the carbides produced by carburizing or carbonitriding are transformed to $M_7C_3$ type having such a property as to make the carbides hard and slow in grain growth to prevent from becoming coarse, so that the addition of Cr contributes to the improvement of the rolling fatigue strength.

The lower limit of the Cr content is set to 0.5 wt % because it is the necessary minimum level for securing improved hardenability. The upper limit of the Cr content is set to 3.0 wt % because it is a carbide-forming element that is effective in improving wear resistance, similarly to vanadium, but Cr tends to form coarse carbides which can potentially become a starting point for flaking in rolling fatigue when the coarsening occurs. Furthermore, if the Cr content exceeds 3.0 wt %, an oxide skin is formed on the surface of the material so as to prevent carbon from entering into the surface during an ordinary carburizing treatment.

Mo: at most 3.0 wt %

Molybdenum is a carbide-forming element which is similar to Cr and V. However, if Mo is added in a large amount, the workability in the pretreatments is deteriorated. Further, it is difficult to make the Mo carbides fine-grained by ordinary heat treatments. Therefore, the upper limit for the addition of Mo is set to 3.0 wt %.

On the other hand, Molybdenum is also an element that is significantly effective in improving the resisting property for temper softening. Accordingly, it is preferable to be contained.

Mn: 0.3 to 1.2 wt %

Manganese which also improves hardenability is an essential element to bearing materials. To exhibit its effect to improve hardenability, Mn must be contained in an amount of at least 0.3 wt %. However, if the Mn content is excessive, non-metallic inclusions are liable to occur in a large amount. Therefore, the upper limit of the Mn content is set to 1.2 wt %.

Si: 0.3 to 1.5 wt %

Silicon is an element that is significantly effective in improving the resisting property for temper softening. To exhibit its effect, Si must be contained in an amount of at least 0.3 wt %. However, since Si is also an element to have the carburizing preventiveness, the upper limit of the Si content is set to 1.2 wt %.

V: 0.8 to 2.0 wt %

According to the present invention, a predetermined amount of vanadium V is added to the above-described low-medium carbon, low alloy steel.

Vanadium is an element which is effective in improving the resisting property for temper softening and generating very fine-grained and hard VC-type carbides. The addition of Vanadium contributes to an improvement in wear resistance and life characteristics.

The lower limit of the V content is set to 0.8 wt % because the effect of vanadium is not fully exhibited if it is added in less than 0.8 wt %. In order to advance the precipitation of VC-type carbides, the V concentration must exceed the C concentration (V/C≧1). Accordingly, the lower limit of the V content is set to 0.8 wt %.

On the other hand, the upper limit of the v content is set to 2.0 wt % because excess addition of vanadium not only deteriorates the workability but also results in a higher cost.

In addition, the upper limit of the concentration ratio V/C is automatically set to 2.5 by the lower limit of the C concentration in the product surface and the upper limit of the V content.

EXAMPLE

Examples of the present invention will now be described with reference to the accompanying drawings.

FIG. 1 is a front view of an embodiment of the rolling bearing 1 of the present invention. The rolling bearing 1 includes an outer race 2, an inner race 3, rolling elements 4 and a cage 5.

Various alloy compositions were used as raw material to make examples of the present invention, as well as comparative and conventional examples, as shown in Table 1.

TABLE 1

|  | Alloy Sample No. | Alloy Composition | | | | | | Remarks |
| --- | --- | --- | --- | --- | --- | --- | --- | --- |
|  |  | C | V | Cr | Mo | Mn | Si |  |
| Invention | 1 | 0.4 | 0.9 | 1.2 | — | 0.4 | 0.7 |  |
| Invention | 2 | 0.4 | 1.9 | 1.8 | 2.1 | 0.4 | 0.8 |  |
| Comparison | 3 | 0.4 | 2.5 | 1.9 | 2.0 | 0.4 | 0.8 | V > 2.0 wt % |
| Comparison | 4 | 0.4 | 1.7 | 3.2 | 2.0 | 0.4 | 0.8 | Cr > 3.0 wt % |
| Comparison | 5 | 0.4 | 1.6 | 1.8 | 3.2 | 0.4 | 0.7 | Mo > 3 wt % |
| Comparison | 6 | 0.4 | 1.6 | 1.8 | 1.9 | 0.4 | 1.6 | Si > 1.5 wt % |
| Comparison | 7 | 0.75 | 1.7 | 1.5 | 2.0 | 0.4 | 0.8 | C > 0.7 wt % |
| Conventional | 8 | 1.0 | — | 1.5 | — | 0.3 | 0.2 | SUJ 2 |
| Conventional | 9 | 0.2 | — | 1.0 | — | 0.7 | 0.2 | conventional case hardening steel SCr 420 |
| Conventional | 10 | 0.4 | 0.6 | 1.5 | 1.0 | 0.4 | 1.0 | case carburizing steel with improved resisting property for temper softening |
| Conventional | 11 | 0.8 | 1.0 | 4.0 | 4.0 | 0.3 | 0.2 | high alloy steel N50 |

Alloy Sample Nos. 1 and 2 are alloy steels according to the present invention. Alloy Sample No. 3 is an alloy steel containing the vanadium content exceeding its upper limit, compared with the present invention. Alloy Sample No. 4 is an alloy steel containing the chromium content exceeding its upper limit. Alloy Sample No. 5 is an alloy steel containing the molybdenum content exceeding its upper limit. Alloy Sample No. 6 is an alloy steel containing the silicon content exceeding its upper limit. Alloy Sample No. 7 is an alloy steel containing the carbon content exceeding its upper limit.

Alloy Sample No. 8 is a conventional alloy steel (JIS SUJ 2) containing the carbon content exceeding its upper limit. Alloy Sample No. 9 is also a conventional alloy steel (case hardening steel SCr 420 which is generally employed) containing neither V nor Mo content. Alloy Sample No. 10 is a case carburizing steel with improved resisting property for temper softening, containing the vanadium content which does not reach its lower limit. Alloy Sample No. 11 is also a conventional alloy steel (high alloy steel M50) containing the chromium and molybdenum contents exceeding their upper limits.

The alloy steels having the compositions shown in Table 1 were researched as samples for workability in pretreatments and for carburization property. Thereafter, rolling bearings and test specimens were prepared from the respective samples and subjected to specified heat treatments. Thus, fatigue strength tests and wear tests were conducted.

(A) Workability:

For the purpose of researching the workability of a component of the rolling bearing 1 in pretreatments, the samples were subjected to cutting tests in states before hardening. In the tests, each sample was dry cut with a feed of 0.3 mm/rev, at a cutting speed of 100 m/min and to a depth of cut of 2.0 mm, and the resulting amount of wear was measured on a flank of a single point tool. The results of the cutting tests are shown in FIG. 2.

Figure 3:
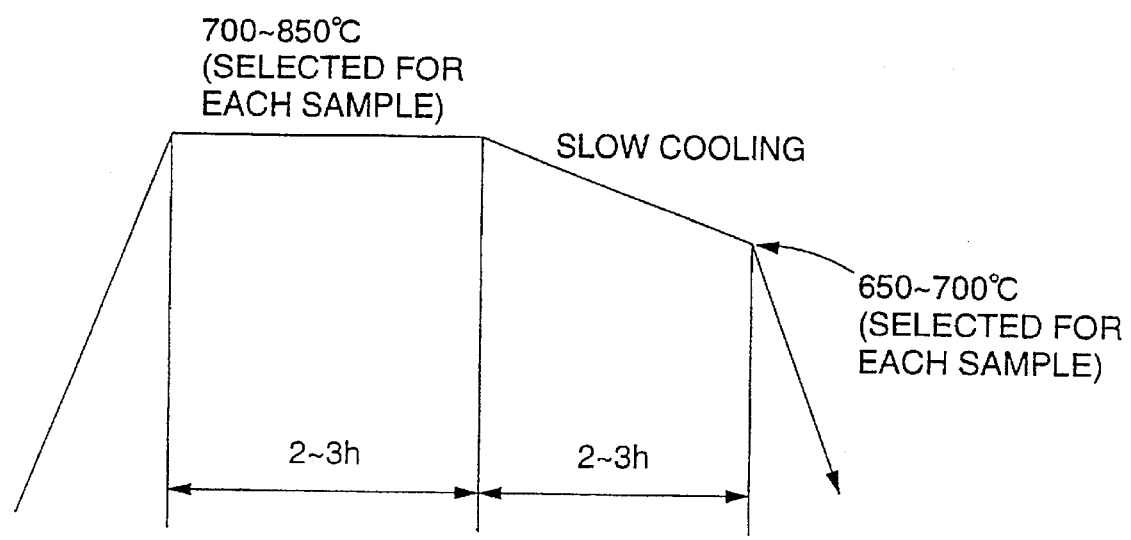
FIG. 3 shows conditions of annealing before the cutting is done in the cutting tests.

The machinability of the individual samples was improved by annealing under optimal temperature conditions selected for each sample to secure that its hardness after being annealed would be the lowest for the respective composition. FIG. 3 shows the annealing step in which 700° to 850° C. and 650° to 700° C. represent ranges of temperatures selected for the respective sample.

Figure 2:
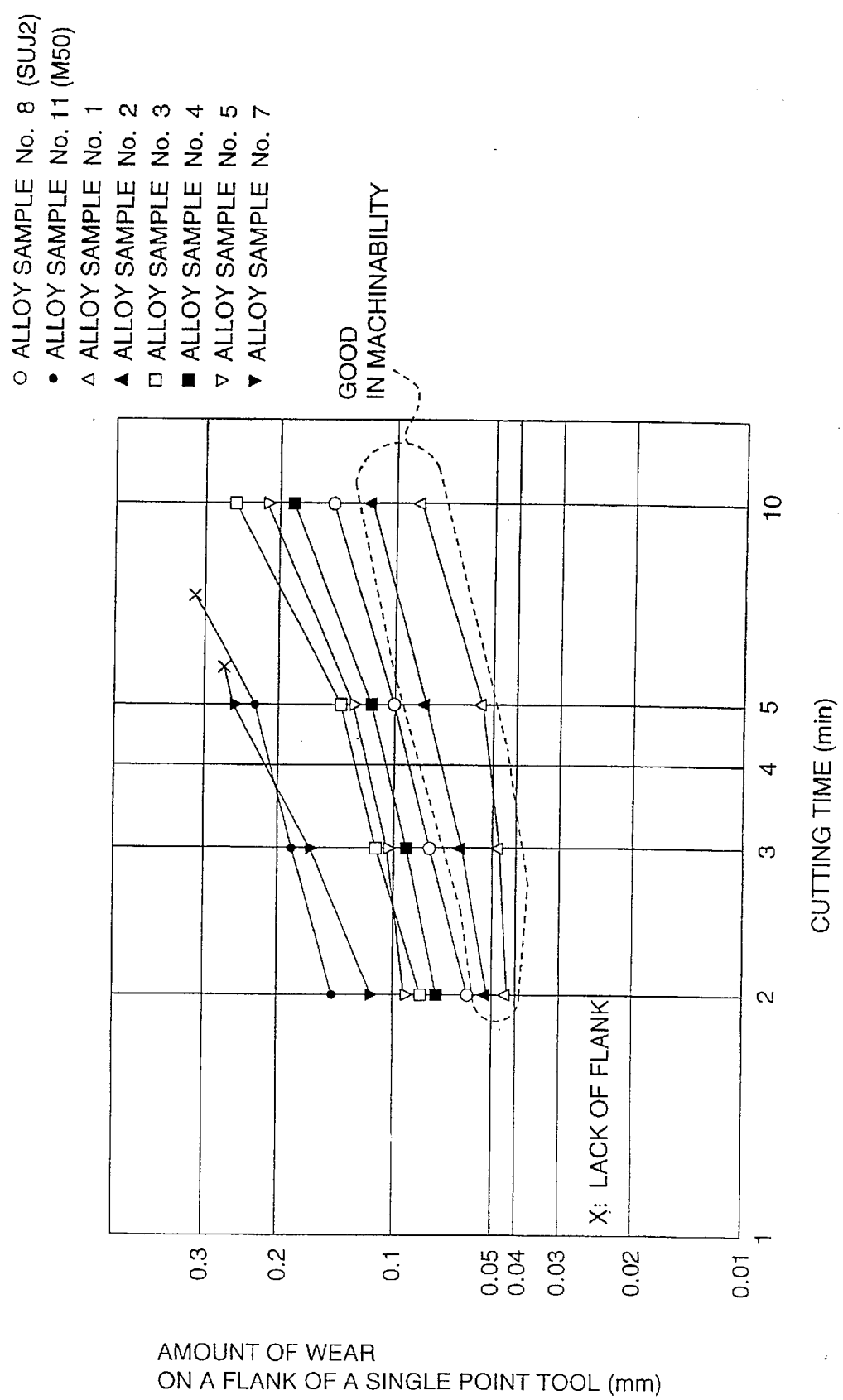
FIG. 2 is a graph showing results of cutting tests in the embodiment.

It is evident that the results shown in FIG. 2 reach the following conclusion:

(1) The high carbon steels containing V, Cr and Mo (Alloy Sample Nos. 7 and 11 with C≧0.7 wt %) extremely deteriorated the machinability; and (2) In medium carbon steels, Alloy Sample Nos. 3, 4 and 5 which were out of the present invention in terms of the V, Cr or Mo content were inferior in machinability, compared with SUJ 2 which was a high-carbon and high-chromium steel generally employed as a bearing material.

Figure 4:
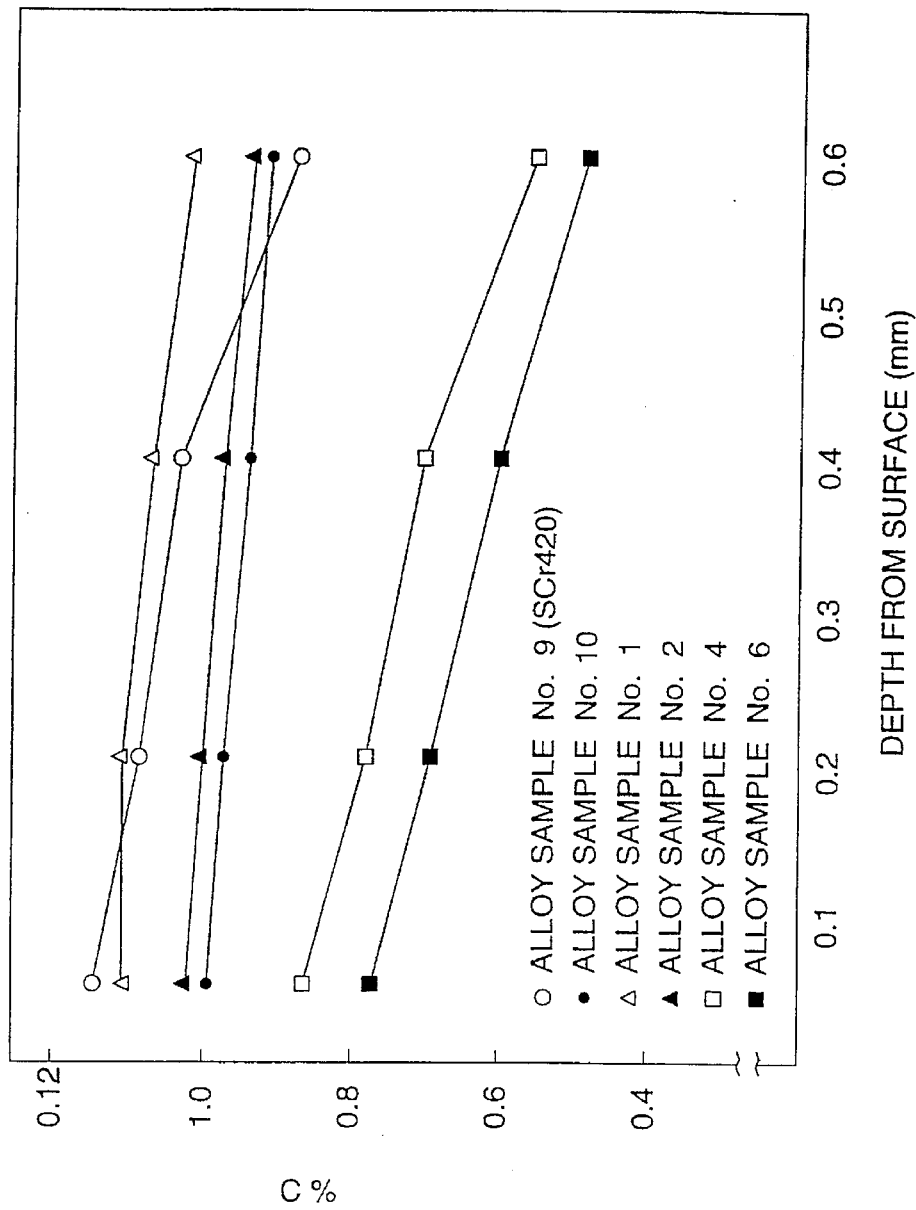
FIG. 4 is a graph showing results of tests conducted to evaluate carburization property.

(B) Carburization property:

The samples were carburized to give a carbon content of 1.0 to 1.2 wt % (carbon potential Cp=1.1%) in a surface. Subsequently, the gradient of carbon concentration was measured from the surface. The results are shown in FIG. 4.

Evidently, the carburization property was remarkably deteriorated when the Cr content exceeded 3.0 wt % (Alloy Sample No. 4) or the Si content exceeded 1.5 wt % (Alloy Sample No. 6).

Figure 5:
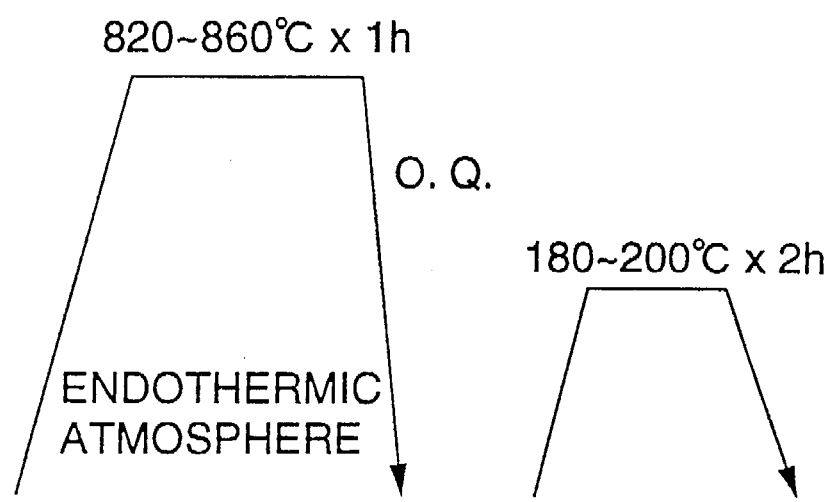
FIG. 5 shows steps in a heat treatment test when the through hardening is employed.
Figure 7:
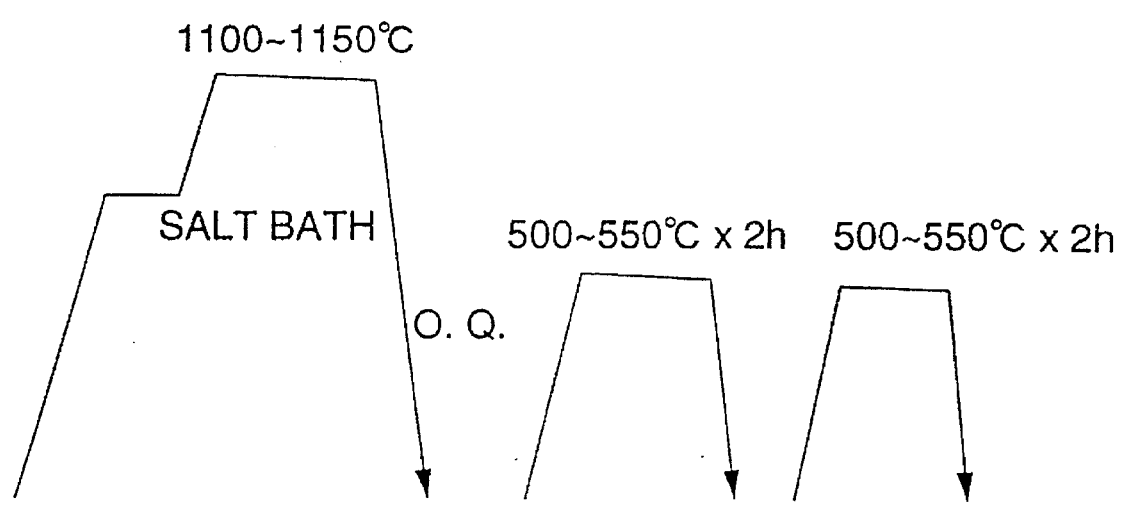
FIG. 7 shows steps in another heat treatment test when the through hardening is employed.

(C) Heat treatments and fatigue strength tests and wear tests:

Test Specimens A to H having compositions selected from Table 1 were subjected to heat treatments under varying conditions. The surface concentrations of C and N, the surface hardness and the surface V/C ratio were measured for each specimen. The results are shown in Table 2. Moreover, the reference characters "O.Q" indicated in FIGS. 5 and 7 denote oil quenching.

TABLE 2

Figure 6:
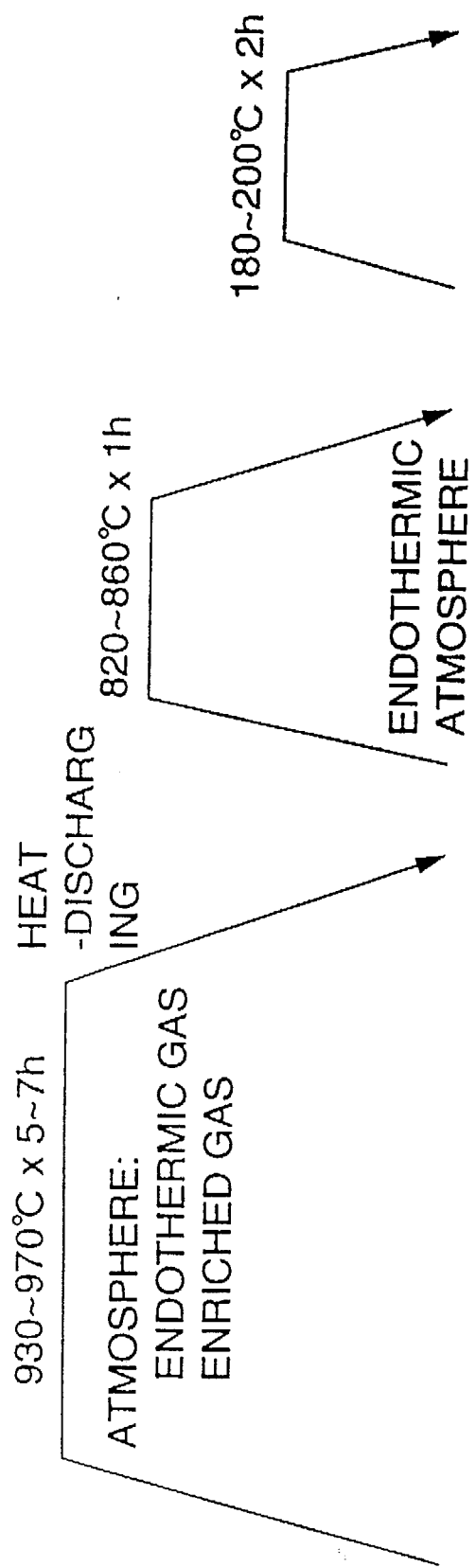
FIG. 6 shows steps in a heat treatment test when the carburization is employed.
Figure 8:
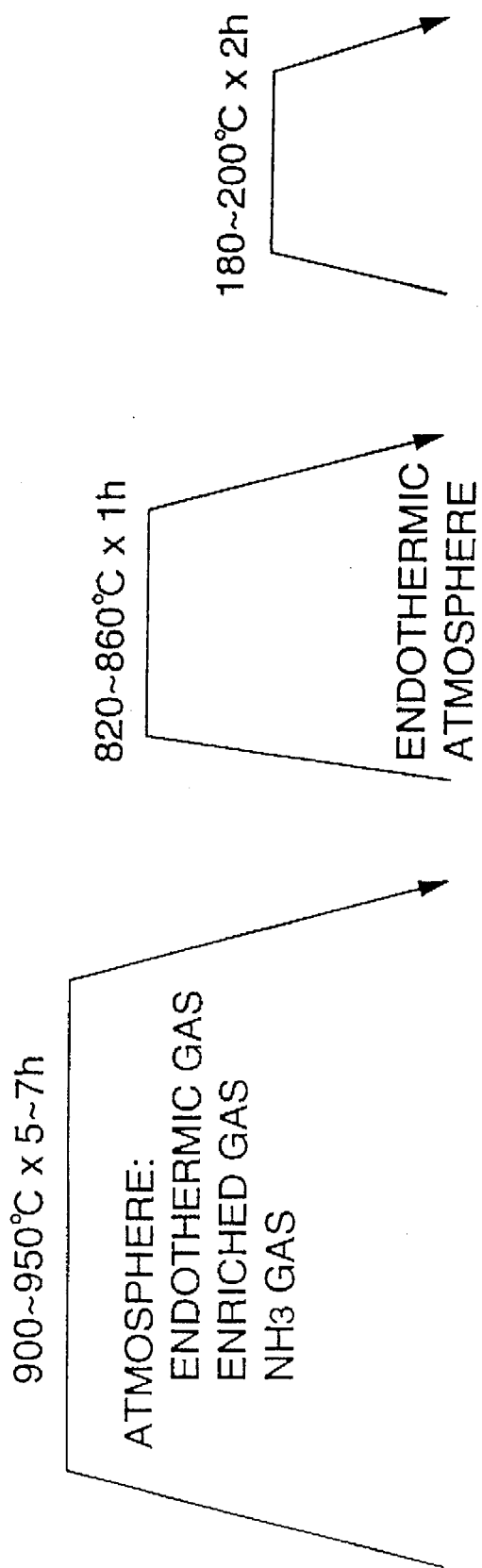
FIG. 8 shows steps in a heat treatment test when the carbonitriding is employed.

| Test Specimen | Alloy Sample No. | Heat Treatment | C % | N % | Hardness, Hv | V/C | Remarks |
| --- | --- | --- | --- | --- | --- | --- | --- |
| A | 1 | carburizing (see FIG. 6) - hardening and tempering | 0.8 | — | 751 | 1.1 | Invention |
| B | 2 | carburizing (see FIG. 6) - hardening and tempering | 1.0 | — | 779 | 1.9 | Invention |
| C | 2 | carbonitriding (see FIG. 8) - hardening and tempering | 1.0 | 0.3 | 787 | 1.9 | Invention |
| D | 1 | carburizing (see FIG. 6) - hardening and tempering | 1.2 | — | 764 | 0.8 | Comparison |
| E | 10 | carburizing (see FIG. 6) - hardening and tempering | 1.0 | — | 761 | 0.6 | Comparison |
| F | 8 | through hardening (see FIG. 5) - tempering | 1.0 | — | 740 | — | Conventional (SUJ 2) |
| G | 9 | carburizing (see FIG. 6) - hardening and tempering | 1.1 | — | 720 | — | Conventional (SCr 420) |
| H | 11 | through hardening (see FIG. 7) - tempering | 0.8 | — | 782 | 1.3 | Conventional (M50) |

Test Specimens D and E were comparative examples so that their V/C values did not reach the lower limit, compared with the present invention.

FIGS. 5 to 8 show the steps of the heat treatments which are to be performed.

The fatigue strength tests and wear tests were conducted under conditions as set forth in below. Each test was conducted at a high temperature of 130° C. to simulate severe use conditions.

(C-1) Fatigue strength test:

Tester: A life tester for deep-groove ball bearing (SIS 6206 type)

Lubrication condition: To simulate severe conditions, foreign matter (iron powder, hardness Hv: 500 to 600; particle size: 74–147 μm) was entered into a lubricant.

Lubricant: JKB oil R0150

Load: Fr=640 kgf

Rotational speed: 5,000 rpm

Evaluation: The life of each test specimen was regarded as having come to an end when flaking occurred.

The test results are shown in FIG. 9, which plots the hardness at 130° C. on the horizontal axis and the $L_{10}$ life on the vertical axis.

As is apparent from FIG. 9, characteristics of the rolling fatigue strength improve as increasing the hardness at 130° C. It is evident that the test results reach the conclusion that superior life characteristics can be attained by increasing the concentrations of Cr, Mo, V and Si which are elements improving the resisting property for temper softening in such a way as to increase the hardness at 130° C.

Figure 10A:
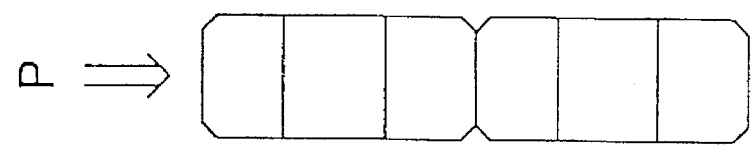
FIG. 10A is a side view for illustrating a two-cylinder wear tester and FIG. 10B is a front view thereof.
Figure 10B:
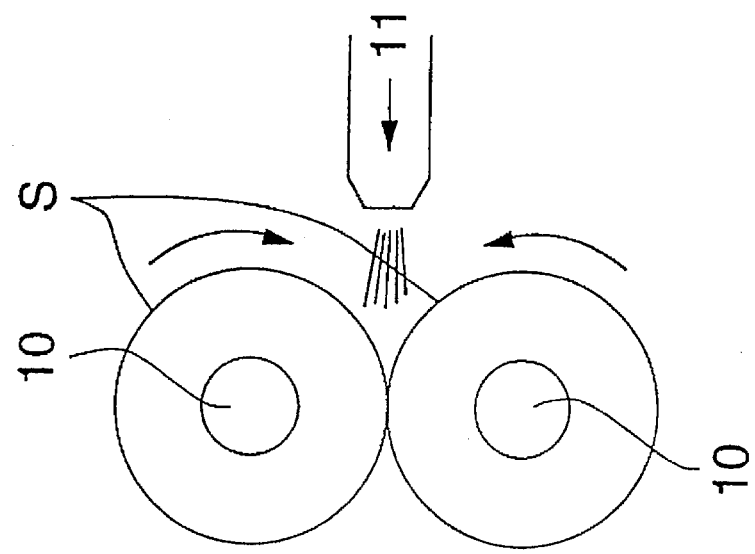

(C-2) Wear test:

The wear tests were conducted with a two-cylinder wear tester as shown in FIGS. 10A and 10B. Test specimens S were mounted on a pair of vertically opposed cylinders 10, which were held in mutual contact and rotated contrary at low speed under a pressure P that was applied from above of the wear tester with a lubricant 11 being sprayed between the two cylinders. The wear rates (mg/m) relative to both specimens S were measured to obtain the average value.

Contact pressure: 100 kgf/mm²

Rotational speed: 1,000 rpm

Slip ratio: 20%

Lubricant: FBK oil R080

Feed rate: 700 cc/min

Figure 11:
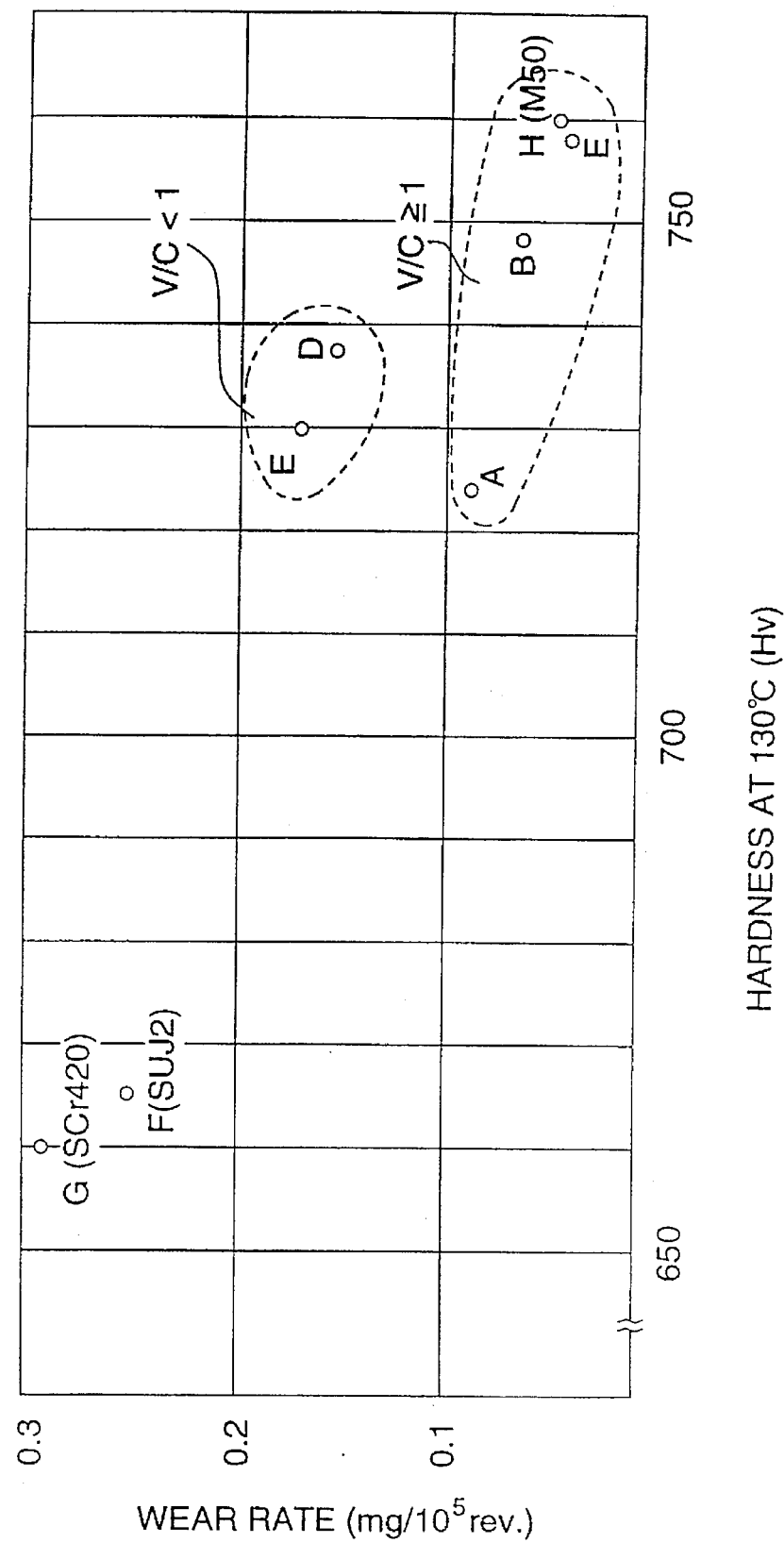
FIG. 11 is a graph showing results of wear tests conducted by the wear tester.

The test results are shown in FIG. 11, which plots the hardness at 130° C. on the horizontal axis and the specific wear on the vertical axis.

As is apparent from FIG. 11, the wear resistance tends to improve as increasing the hardness at 130° C. It is evident that the results shown in FIG. 11 reach the conclusion that superior wear resistance is exhibited when the concentration ratio of V to C satisfies the relation of V/C≧1.

Moreover, the present invention is applicable to any one of the components of a rolling bearing, i.e., the inner race, the outer race and the rolling elements. If desired, it may be applied to all components of the rolling bearing.

As described above, the rolling bearing of the present invention is characterized in that at least one component of the inner race; the outer race and the rolling elements is formed of an alloy steel that contains 0.8 to 2.0 wt % of vanadium in a low-medium carbon, low alloy steel, which is subjected to carburization or carbonitriding in the process of heat treatments, so as to precipitate VC-type carbides on the surface of the finished product that have a surface carbon concentration of 0.8 to 1.5 wt % and a surface concentration ratio V/C of 1 to 2.5.

Accordingly, since the surface of the product is covered with very fine-grained and hard VC-type carbides, it is able to produce a rolling bearing that exhibits significantly improved wear resistance under severe use conditions. Simultaneously, the rolling bearing has the advantages of superior workability in pretreatments and high productivity in heat treatments.

What is claimed is:

1. In a rolling bearing comprising an inner race, an outer race and a plurality of rolling elements, the improvement wherein at least one member of the inner race, the outer race and the rolling elements is made of an alloy steel comprising:

0.1 to 0.7 wt % of C;
0.8 to 2.0 wt % of V;
0.5 to 3.0 wt % of Cr;
0.3 to 1.2 wt % of Mn;
0.3 to 1.5 wt % of Si;
at most 3.0 wt % of Mo; and
the balance being the member being carburized or carbonitrided so that a surface of the member has a carbon concentration of 0.8 to 1.5 wt % and a concentration ratio V/C of 1 to 2.5 to thereby precipitate VC-type carbides on the surface.

\* \* \* \* \*